(12) United States Patent
Stewart et al.

(10) Patent No.: US 11,810,598 B2
(45) Date of Patent: Nov. 7, 2023

(54) APPARATUS AND METHOD FOR AUTOMATED VIDEO RECORD GENERATION

(71) Applicant: MY JOB MATCHER, INC., Austin, TX (US)

(72) Inventors: Arran Stewart, Austin, TX (US); Steve O'Brien, Raleigh, NC (US)

(73) Assignee: MY JOB MATCHER, INC., Austin, TX (US)

( * ) Notice: Subject to any disclaimer, the term of this patent is extended or adjusted under 35 U.S.C. 154(b) by 0 days.

(21) Appl. No.: 17/667,470

(22) Filed: Feb. 8, 2022

(65) Prior Publication Data

US 2023/0253015 A1 Aug. 10, 2023

(51) Int. Cl.
| | |
|---|---|
| *G11B 27/031* | (2006.01) |
| *G06V 10/82* | (2022.01) |
| *G06V 20/40* | (2022.01) |
| *G10L 15/26* | (2006.01) |
| *G10L 25/57* | (2013.01) |
| *G11B 27/34* | (2006.01) |
| *H04N 5/91* | (2006.01) |

(52) U.S. Cl.
CPC ............ *G11B 27/031* (2013.01); *G06V 10/82* (2022.01); *G06V 20/41* (2022.01); *G06V 20/49* (2022.01); *G10L 15/26* (2013.01); *G10L 25/57* (2013.01); *G11B 27/34* (2013.01); *H04N 5/91* (2013.01)

(58) Field of Classification Search
None
See application file for complete search history.

(56) References Cited

U.S. PATENT DOCUMENTS

| | | | |
|---|---|---|---|
| 7,972,006 B2 | 7/2011 | Giraldo et al. | |
| 2007/0038636 A1 | 2/2007 | Zanghi et al. | |
| 2008/0262859 A1 | 10/2008 | Ting et al. | |
| 2012/0011162 A1 | 1/2012 | Choban et al. | |
| 2012/0330708 A1 | 12/2012 | Khan | |
| 2017/0365021 A1 | 12/2017 | Stading et al. | |
| 2019/0197049 A1 | 6/2019 | Aikawa | |
| 2021/0326747 A1* | 10/2021 | Shi | G06N 3/0454 |
| 2022/0028426 A1* | 1/2022 | Park | G11B 27/036 |
| 2022/0198399 A1* | 6/2022 | Sharma | G06Q 10/1053 |

FOREIGN PATENT DOCUMENTS

| | | | | |
|---|---|---|---|---|
| CN | 104463423 A | * | 3/2015 | ........... G06Q 10/105 |
| CN | 104463423 B | | 7/2017 | |
| CN | 104021441 B | | 7/2018 | |

OTHER PUBLICATIONS

Joseph Clint J. Molon, Sandra Mae W. Famador, Automatic Curriculum Vitae Creator Using a Virtual Human Speech Interviewer, Dec. 31, 2016.

* cited by examiner

*Primary Examiner* — Hung Q Dang
(74) *Attorney, Agent, or Firm* — CALDWELL INTELLECTUAL PROPERTY LAW

(57) ABSTRACT

A method for automatic video record generation is provided. method may include a plurality of sensors configured to detect at least audiovisual data. Method may include a processor that may be configured to generated prompts for a user to respond to. User responses may be collected and formed into a video record. Method may use machine learning to automatically generate video records by assembling a plurality of temporal sections gathered from audiovisual data from a user.

18 Claims, 7 Drawing Sheets

APPARATUS AND METHOD FOR AUTOMATED VIDEO RECORD GENERATION

FIELD OF THE INVENTION

The present invention generally relates to the field of human resource technology. In particular, the present invention is directed to apparatuses and methods for automated video record generation.

BACKGROUND

Video content (including short-form video content) has steadily been rising in popularity for many years. Its advantages as a communication medium are manifest. However, present ways of doing business are not capable of making optimal use of this form of media.

SUMMARY OF THE DISCLOSURE

In an aspect an apparatus for automated video record generation includes a plurality of sensors configured to: capture at least audiovisual data from a user; generate at least an audiovisual datum based on the at least audiovisual data from a user; at least a processor communicatively connected to the plurality of sensors; and a memory communicatively connected to the processor, the memory containing instructions configuring the at least a processor to: convert the at least an audiovisual datum into a video file; and generate a video record of a user based on the at least an audiovisual datum, wherein generating the video record further comprises: identifying a plurality of temporal sections of the video file; classifying each temporal section of the plurality of temporal sections to a resume prompt of a plurality of resume prompts, where the plurality of resume prompts is arranged in a prompt ordering; and assembling the plurality of classified temporal sections into the video record using the prompt ordering.

In another aspect a method for automated video record generation includes: capturing, by plurality of sensors, at least audiovisual data from a user; generating, by plurality of sensors, at least an audiovisual datum; converting, by computing device, the at least an audiovisual datum into a video file; generating, by processor, a video record of a user based on the at least an audiovisual datum, wherein assembling the video record further comprises: identifying, by processor, a plurality of temporal sections of the video file; classifying, by processor, each temporal section of the plurality of temporal sections to a resume prompt of a plurality of resume prompts, where the plurality of resume prompts is arranged in a prompt ordering; and assembling, by processor, the plurality of classified temporal sections into the video record using the prompt ordering.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to apparatuses and methods for automated video record generation. In an embodiment, video records may represent a user more wholistically than a tradition resume. Video records may allow a user to show a more dynamic version of themselves than a traditional paper resume. Aspects of the present disclosure can be used to generate prompts for users to answer. Aspects of the present disclosure can also be used to receive audiovisual data from the user. This is so, at least in part, because of the plurality of sensors. Exemplary embodiments illustrating aspects of the present disclosure are described below in the context of several specific examples.

Figure 1:
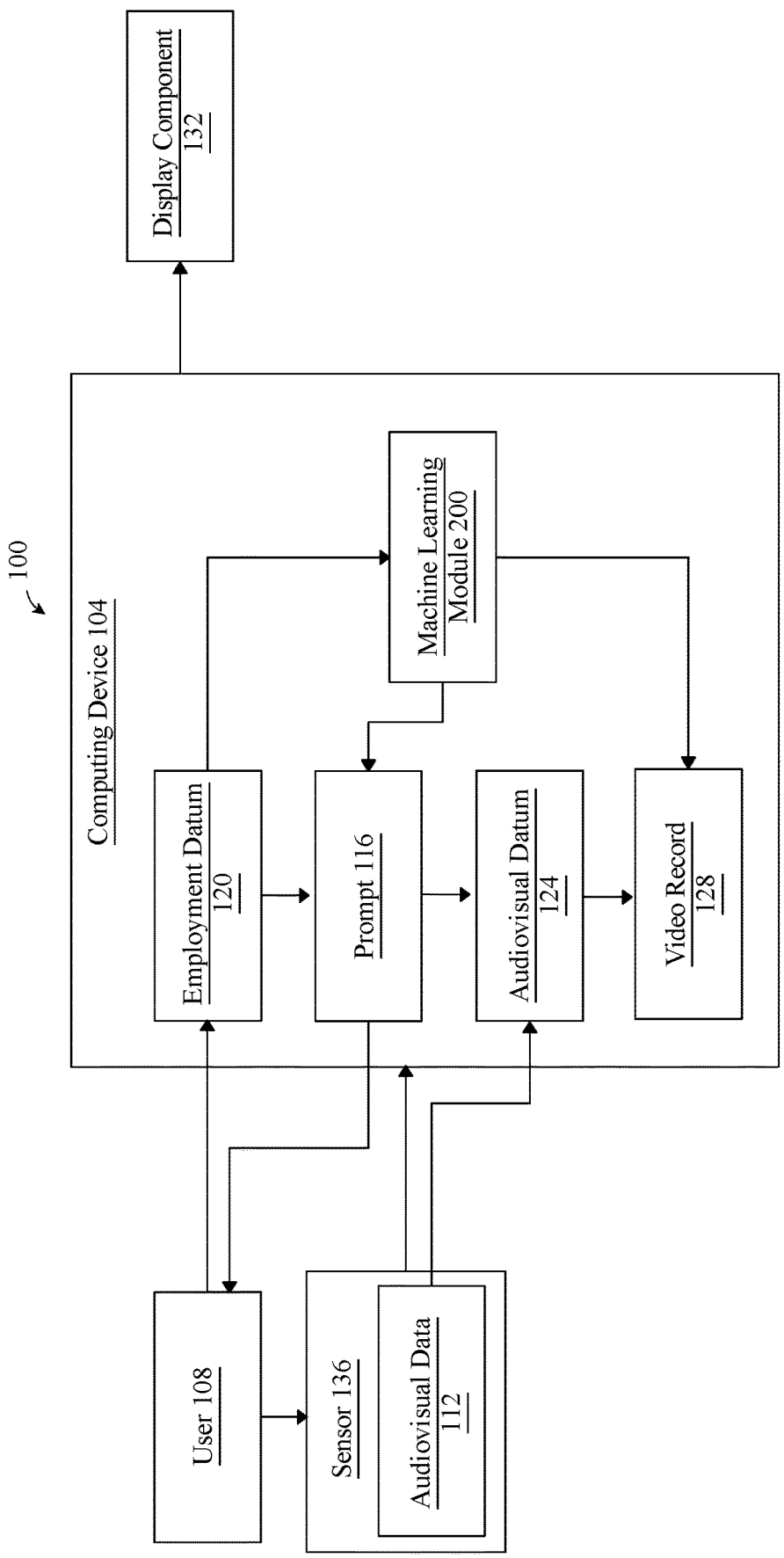
FIG. 1 is a block diagram of an embodiment of an apparatus for automated video record generation.

Referring now to FIG. 1, an exemplary embodiment of an apparatus 100 for automatically generating video records. Apparatus 100 includes a plurality of sensors. As used in this disclosure, a "sensor" is a device that is configured to detect a phenomenon and transmit information and/or datum related to the detection of the phenomenon. For instance, and without limitation, a sensor 136 may transform an electrical and/or nonelectrical stimulation into an electrical signal that is suitable to be processed by an electrical circuit, such as a processor 104. A sensor 136 may generate a sensor output signal, which transmits information and/or datum related to a detection by the sensor. A sensor output signal may include any signal form described in this disclosure, such as for example, digital, analog, optical, electrical, fluidic, and the like. In some cases, a sensor, a circuit, and/or a controller may perform one or more signal processing steps on a signal. For instance, a sensor, circuit, and/or controller may analyze, modify, and/or synthesize a signal in order to improve the signal, for instance by improving transmission, storage efficiency, or signal to noise ratio. Plurality of sensors includes an auditory sensor and an optical sensor. In an embodiment, an auditory sensor may include microphones, and other sensors that detect sound. In an embodiment, an optical sensor may include sensors that convert light rays into electrical signals such as cameras, infrared sensors, photodetectors, motion sensors, and the like. The plurality of sensors may be physically isolated from each other. "Physical isolation", for the purposes of this disclosure, refers to a first system's components, communicative connection, and/or any other constituent parts, whether software or hardware, are separated from a second system's components, communicative connection, and any other constituent parts, whether software or hardware, respectively. The plurality of sensors is configured to detect at least audiovisual data 112 from a user 108. The plurality of sensors may be attached to the processor 104, discussed in further detail below, or they may be a separate entity and communicatively connected to a processor 104. A user 108 may have access to the plurality of sensors such that the sensors may detect at least audiovisual data 112 from a user 108. As used in this disclosure, "audiovisual" relates to information that includes images, verbal content, non-verbal content, audio content, as well as any other information gathered from auditory and optical sensors. In an embodiment, audiovisual data 112 may include user movements, sounds, voices, videos, written data, or any other data that may occur to persons skilled in the art upon reviewing the entirety of this disclosure.

Still referring to FIG. 1, each sensor 136 in the plurality of sensors is configured to generate at least an audiovisual datum 124 based on the at least audiovisual data 112 from a user 108. In one or more embodiments, each sensor 136 of the plurality of sensors may generate a sensor output signal that includes information and/or datum related to the detected event and/or phenomenon, such as, for example, audiovisual datum 124 of the plurality of sensors respectively. For the purposes of this disclosure, "audiovisual datum" is an electrical signal representation information and/or datum of a detected event associated with the audiovisual data 112. For example and without limitation, audiovisual datum 124 may include audio recording of user speak, video recording of user, and the like.

Still referring to FIG. 1, apparatus 100 includes a processor 104 communicatively connected to the plurality of sensors. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. For example, and without limitation, each sensor 136 of the plurality of sensors may be communicatively connected to processor 104. In one or more embodiments, a communicative connection between processor 104 and sensor 136 may be wireless and/or wired. For example, and without limitation, processor 104 and sensor 136 may communicative via a controller area network (CAN) communication. processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, processor 104 may be configured to receive an employment datum 120. For the purpose of this disclosure, "employment datum" is information related to an available and/or open job position. For the purposes of this disclosure, a "job position" (also referred to in this disclosure as a "job") is a paid occupation with designated tasks associated therewith. A job position may include an employment with an employer, such as work as an employee (part-time or full-time), worker, contractor, self-employed, and the like. For example, and without limitation, employment datum 120 may include information and/or data from a job posting and/or listing that describes an open job position. Employment datum may include a job position title, qualifications and/or requirements for the job position, expected responsibilities associated with the job position, benefits with the job position, compensation, geographical location, employer information, and the like. Employment datum may include information related to an employer's expectations of a person hired for such a job position. For instance, and without limitations, employment datum 120 may include minimum qualifications that a candidate must possess to adequately perform the job position. Qualifications for job position may include education, certification, experience, desired skills and/or abilities, personal qualities, and the like. Employment datum may also include information that a person hired for the job position may expect from the job position. For instance, and without limitation, employment datum 120 may include working hours for the job position, a type of salary, degree of professionalism, and the like. Employment datum includes previous work history. In an embodiment, previous work history may include job position title, qualifications and/or requirements for the job position, expected responsibilities associated with the job position, benefits with the job position, compensation, geographical location, employer information, and the like related to a previous job a user 108 may have had. In one or more embodiments, employment datum 120 may include a datum or a plurality of data related to an available job.

In one or more embodiments, employment datum 120 may be provided to or received by processor 104 using various means. In one or more embodiments, employment datum 120 may be provided to processor 104 by a user 108, such as a job seeker or potential job candidate that is interested in being a candidate or considered for a job position by the employer of the job position. A user 108 may manually input employment datum 120 into processor 104 using, for example, a graphic user interface and/or an input device. For example, and without limitation, a user 108 may use a peripheral input device to navigate graphical user interface and provide employment datum 120 to processor 104. Non-limiting exemplary input devices include keyboards, joy sticks, light pens, tracker balls, scanners, tablet, microphones, mouses, switches, buttons, sliders, touch-screens, and the like. In other embodiments, employment datum 120 may be provided to processor 104 by a database over a network from, for example, a network-based platform. Employment datum may be stored in a database and communicated to processor 104 upon a retrieval request form a user 108 and/or from processor 104. In other embodiments, employment datum 120 may be communicated from a third party application, such as from a third party application on a third party server, using a network. For example, employment datum 120 may be downloaded from a hosting website for job listings. In one or more embodiments, processor 104 may extract employment datum 120 from an accumulation of information provided by a database. For instance, and without limitation, processor 104 may extract needed information from database regarding the job position and avoid taking any information determined to be unnecessary. This may be performed by processor 104 using a machine-learning model, which is described in this disclosure further below.

With continued reference to FIG. 1, processor 104 may be configured to generate a prompt 116 based on the employment datum 120. As used in this disclosure, a "prompt" is a brief passage of audiovisual information such as text, images, spoken words or the like, that provides a guide and/or starting point for a user response. In an embodiment, a prompt 116 may include a question pertaining to work history of a user 108, user work sills, user work preferences, and the like. In an embodiment, a prompt 116 may include questions that determine how a user 108 behaves. For example, a prompt 116 may be "discuss a time that you (the user 108) handled conflict in the workplace". Prompt may be presented as text on a graphical user interface (GUI), discussed in further detail below. In an embodiment, prompt 116 may also be presented as audio, or a combination of visual and audio forms. In another embodiment, prompt 116 may be presented by a virtual avatar. For example, a virtual avatar may be presented as a robotic avatar, a human avatar, a 2D model and/or figure, a 3D model and/or figure, and the like. Computing device is further configured to generate prompt 116 using a virtual assistant. As used herein, a "virtual assistant" is a computer application program that understands natural language voice commands and emulates human interaction. In an embodiment, a virtual assistant may include Siri, Alexa, Google Assistant, Cortana, Bixby, and the like.

Still referring to FIG. 1, processor 104 may be further configured to use a machine learning module 200 to generate a prompt 116. A machine learning module 200 may use a machine learning process. A machine learning process, also referred to as a machine-learning algorithm, is a process that automatedly uses training data and/or a training set as described below to generate an algorithm that will be performed by a processor 104 and/or module to produce outputs given data provided as inputs; this is in contrast to a non-machine learning software program where the commands to be executed are determined in advance by a user 108 and written in a programming language. Machine learning module is described in further detail in FIG. 2. Machine learning process may be trained using training data, described in further detail in FIG. 2, to input employment datum 120 and output prompts for a user 108 pertaining to the employment datum 120. In an embodiment, machine learning process may generate a prompt 116 of "what is the hardest dish you have made?" for a user 108 that has a work history of working as a chef. In another embodiment, machine learning process may generate a prompt 116 pertaining to a job position that a user 108 may be applying to. For example, prompt 116 may ask user 108 to discuss geometric dimensioning and tolerancing for a manufacturing engineering position. Computing device may generate classifier using a classification algorithm, defined as a processes whereby a processor 104 derives, from training data, a model known as a "classifier" for sorting inputs into categories or bins of data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Classifier may categorize employment datum 120 of a user 108 and/or prompts such as experience, work skills, people skills, problem solving, managements skills, and the like. In an embodiment, processor 104 may use a machine learning module 200 to classify employment datum 120 to a template comprising of a list of prompts in a specific order. Template may be generated by a machine learning module 200 in ways discussed above. Additionally, template may be generated by a human and stored in processor 104 for machine learning module 200 to use. Template may comprise of a specific order to present prompts to user 108 such that generated a video record (discussed below) may utilize the specific order to assemble video clips.

Still referring to FIG. 1, processor 104 may use a language processing model to extract words from the employment datum 120. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas; spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by processor 104 and/or language processing module to produce associations between one or more words extracted from at least a document and detect associations, including without limitation mathematical associations, between such words. Associations between language elements, where language elements include for purposes herein extracted words, relationships of such categories to other such term may inclue, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at processor 104, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Continuing to reference FIG. 1, processor 104 may be configured to receive the at least an audiovisual datum and convert the at least an audiovisual datum into a video file. Computing device may receive at least an audiovisual datum from a sensor 136 or plurality of sensors after presenting the prompt 116 to the user 108. Audiovisual datum may be stored in a database such that the processor 104 may extract needed information at any time. Processor 104 is configured to generate a video record 128 of the user 108 based on the at least an audiovisual datum. As used in this disclosure, a "video record" is an item of digital media in visual and/or audio form to provide a recording promoting a subject. For example, a video record may include a video resume. As used in this disclosure, a "subject" is a person, for example a jobseeker. In some cases, video record 128 may include content that is representative or communicative of at least an attribute of the subject. Attributes may include the subject's skills, competencies, credentials, talents, and the like. In some cases, attributes may be explicitly conveyed within video record 128. Alternatively, or additionally, in some cases, attributes may be conveyed implicitly within video record 128. The subject may be represented directly by video record 128. For example, in some cases, an image component may represent a visual of the subject. As used in this disclosure, an "image component" may be a visual representation of information, such as a plurality of temporally sequential frames and/or pictures, related to a video record. For example, an image component may include animations, still imagery, recorded video, and the like. In some cases, video record 128 may include a digital video, which may be communicated by way of digital signals, for example between computing devices which are communicatively connected with at least a network. To optimize speed and/or cost of transmission of video record 128. Video may be compressed according to a video compression coding format (i.e., codec). Exemplary video compression codecs include H.26x codecs, MPEG formats, VVC, SVT-AV1, and the like. In some cases, compression of a digital video may be lossy, in which some information may be lost during compression. Alternatively, or additionally, in some cases, compression of a digital video may be substantially lossless, where substantially no information is lost during compression.

Continuing to refer to FIG. 1, generating the video record 128 further includes identifying a plurality of temporal sections of the video file created from the audiovisual datum. As used herein, a "temporal section" is a clip of a video file that is marked by a start and end time of the whole video file. A plurality of temporal sections may be identified using a neural network, discussed in further detail in FIG. 3. A neural network may be trained to output temporal sections of the video file. A temporal section may be user defined such that a user may input into a processor, temporal sections of a video file. A temporal section may be defined in any other way is contemplated within the scope of this disclosure. Temporal sections may be based on resume prompt 116 (also referred to as "prompt") such that each section has a clip of the user 108 answering a prompt 116. Neural network may be training by inputting training examples of videos partitioned by hand, wherein the start of the temporal section is the prompt 116 and the end of the temporal section is the end of the user's answer to the prompt 116. Neural network may be trained to recognize the start of a temporal section by the presentation of a title card of the prompt and the end of a temporal section as the start of the next title card. As used herein, a "title card" is an audiovisual representation of a prompt. In an embodiment, a title card may have the prompt written on a colored background before showing a user 108 answering the prompt.

Continuing to refer to FIG. 1, generating the video record 128 further includes classifying each temporal section of the plurality of temporal sections to a resume prompt of a plurality of resume prompts, where the plurality of resume prompts is arranged in a prompt ordering. Temporal sections extracted from the audiovisual datum video file may be classified to resume prompts. In some cases, processor 104 may use audiovisual speech recognition processes (AVSR) to recognize verbal content in temporal sections of the video file. AVSR is discussed in further detail below. Processor 104 may use AVSR to recognize a presented resume prompt 116 and associate prompt 116 with the temporal section. In other cases, processor 104 may use optical character recognition or optical character reader (OCR) including automatic conversion of images of written (e.g., typed, handwritten or printed text) into machine-encoded text. In this case, processor 104 may recognize a title card and associate the title card with a prompt 116. Processor 104 may use a classification algorithm to classify temporal sections into bins, wherein the prompt 116 is the classifier and the bins of data contain the temporal sections related to the prompt 116. Additionally, the plurality of resume prompts and the associated temporal sections are arranged in a prompt ordering. In an embodiment, processor 104 may take the ordering of a template of prompts (discussed in an example above) and organize temporal sections into the ordering of the template. Template of prompts may be used by a classification algorithm to determine the prompts to present to a user 108. In some cases, processor 104 may organize temporal sections from general prompts into more job specific prompts. For example, processor 104 may organize temporal sections starting from prompts about a user's background to more technical questions, like questions about job related tasks. Prompt ordering may be user determined such that the user 108 may have the option to view temporal sections and determine the order that is presented in video record 128. Processor 104 assembles the plurality of classified temporal sections into the video record 128 using the prompt ordering that may be user or machine determined.

Still referring to FIG. 1, temporal sections may be compressed to be assembled into a video record 128. In some embodiments, comparing series of frames may include video compression by inter-frame coding. The "inter" part of the term refers to the use of inter frame prediction. This kind of prediction tries to take advantage from temporal redundancy between neighboring frames enabling higher compression rates. Video data compression is the process of encoding information using fewer bits than the original representation. Any compression is either lossy or lossless. Lossless compression reduces bits by identifying and eliminating statistical redundancy. No information is lost in lossless compression. Lossy compression reduces bits by removing unnecessary or less important information. Typically, a device that performs data compression is referred to as an encoder, and one that performs the reversal of the process (decompression) as a decoder. Compression is useful because it reduces the resources required to store and transmit data. Computational resources are consumed in the compression and decompression processes. Data compression is subject to a space—time complexity trade-off. For instance, a compression scheme for video may require expensive hardware for the video to be decompressed fast enough to be viewed as it is being decompressed, and the option to decompress the video in full before watching it may be inconvenient or require additional storage. Video data may be represented as a series of still image frames. Such data usually contains abundant amounts of spatial and temporal redundancy. Video compression algorithms attempt to reduce redundancy and store information more compactly.

Still referring to FIG. 1, inter-frame coding works by comparing each frame in the video with the previous one. Individual frames of a video sequence are compared from one frame to the next, and the video compression codec sends only the differences to the reference frame. If the frame contains areas where nothing has moved, the system can simply issue a short command that copies that part of the previous frame into the next one. If sections of the frame move in a simple manner, the compressor can emit a (slightly longer) command that tells the decompressor to shift, rotate, lighten, or darken the copy. Usually, the encoder will also transmit a residue signal which describes the remaining more subtle differences to the reference imagery. Using entropy coding, these residue signals have a more compact representation than the full signal. In areas of video with more motion, the compression must encode more data to keep up with the larger number of pixels that are changing. As used in this disclosure, reference frames are frames of a compressed video (a complete picture) that are used to define future frames. As such, they are only used in inter-frame compression techniques. Some modern video encoding standards, such as H.264/AVC, allow the use of multiple reference frames. This allows the video encoder to choose among more than one previously decoded frame on which to base each macroblock in the next frame. While the best frame for this purpose is usually the previous frame, the extra reference frames can improve compression efficiency and/or video quality. The two frame types used in inter-fame coding is P-frames and B-frames. A P-frame (Predicted picture) holds only the changes in the image from the previous frame. For example, in a scene where a car moves across a stationary background, only the car's movements need to be encoded. The encoder does not need to store the unchanging background pixels in the P-frame, thus saving space. A B-frame (Bidirectional predicted picture) saves even more space by using differences between the current frame and both the preceding and following frames to specify its content. An inter coded frame is divided into blocks known as macroblocks. A macroblock is a processing unit in image and video compression formats based on linear block transforms, typically the discrete cosine transform (DCT). A macroblock typically consists of 16×16 samples, and is further subdivided into transform blocks, and may be further subdivided into prediction blocks. Formats which are based on macroblocks include JPEG, where they are called MCU blocks, H.261, MPEG-1 Part 2, H.262/MPEG-2 Part 2, H.263, MPEG-4 Part 2, and H.264/MPEG-4 AVC. After the inter coded frame is divided into macroblocks, instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as motion vector, which points to the position of the matching block at the reference frame. The process of motion vector determination is called motion estimation. In most cases the encoder will succeed, but the block found is likely not an exact match to the block it is encoding. This is why the encoder will compute the differences between them. Those residual values are known as the prediction error and need to be transformed and sent to the decoder. To sum up, if the encoder succeeds in finding a matching block on a reference frame, it will obtain a motion vector pointing to the matched block and a prediction error. Using both elements, the decoder will be able to recover the raw pixels of the block. For example, audiovisual datum video file may be compressed using a P-frame algorithm and broken down into macroblocks. Individual still images taken from video record 128 can then be compared against a reference frame taken from the video file. A P-frame from video record 128 would only hold the changes in image from video file. Exemplary video compression codecs include without limitation H.26× codecs, MPEG formats, VVC, SVT-AV1, and the like. In some cases, compression may be lossy, in which some information may be lost during compression. Alternatively, or additionally, in some cases, compression may be substantially lossless, where substantially no information is lost during compression. In some cases, image component 116a-b may include a plurality of temporally sequential frames. In some cases, each frame may be encoded (e.g., bitmap or vector-based encoding). Each frame may be configured to be displayed by way of a display. Exemplary displays include without limitation light emitting diode (LED) displays, cathode ray tube (CRT) displays, liquid crystal displays (LCDs), organic LEDs (OLDs), quantum dot displays, projectors (e.g., scanned light projectors), and the like.

Still referring to FIG. 1, video record 128 may be representative subject-specific data. As used in this disclosure, "subject-specific data" is any element of information that is associated with a specific subject. Exemplary forms of subject-specific data include image component, video record 128, non-verbal content, verbal content, audio component, as well as any information derived directly or indirectly from video record 128 or any other subject-specific data. For example, subject-specific data could be the physical properties of subject, such as their body posture or facial expression. Subject-specific data could also be audio sensory properties of subject, such as tone of voice or background audio in a resume video.

In some cases, video record 128 may include non-verbal content. As used in this disclosure, "non-verbal content" is all communication that is not characterized as verbal content. As used in this disclosure, "verbal content" is comprehensible language-based communication. For example, verbal content may include "visual verbal content" which is literal and/or written verbal content. Non-verbal content 132 includes all forms of communication which are not conveyed with use of language. Exemplary non-verbal content may include change in intonation and/or stress in a speaker's voice, expression of emotion, and the like. For example, in some cases, non-verbal content may include visual non-verbal content. As used in this disclosure, "visual non-verbal content" is non-verbal content that is visually represented. In some cases, visual non-verbal content may be included within video record 128 by way of image component.

In some cases, a non-verbal classifier may classify non-verbal content present in one or more image component to one or more of video record 128, a feature. Non-verbal classifier may be used with a machine learning algorithm to create a video record 128. Non-verbal classifier may include a number of classifiers, for example each being tasked with classifying a particular attribute or form of non-verbal content. For example, in some cases, non-verbal classifier may classify a video record 128 and related subject as associated with a feature representative of 'personable.' Non-verbal classifier may include another specialized visual non-verbal classifier to classify visual non-verbal content as appearing 'personable' that is, for example, as having appropriate posture, facial expressions, manner of dress, and the like. In some cases, classifier may include or a constituent part of tree structure, for making associations based upon video record 128.

With continued reference to FIG. 1, in some embodiments, image component —b may include or otherwise represent verbal content. For instance, written or visual verbal content may be included within image component. Visual verbal content may include images of written text represented by image component. For example, visual verbal content may include, without limitation, digitally generated graphics, images of written text (e.g., typewritten, and the like), signage, and the like.

Still referring to FIG. 1, in some embodiments, image component may include or otherwise represent audible verbal content related to at least an attribute of user 108. As used in this disclosure, "audible verbal content" is oral (e.g., spoken) verbal content. In some cases, audible verbal content may be included within video record 128 by way of an audio component. As used in this disclosure, an "audio component" is a representation of audio, for example a sound, a speech, and the like. In some cases, verbal content may be related to at least an attribute of subject. Additionally, or alternatively, visual verbal content and audible verbal content may be used as inputs to classifiers as described throughout this disclosure.

Continuing to reference FIG. 1, video record 128 includes a written component. In an embodiment, a written component may include a PDF or a word version of the video record 128. In an embodiment, a written component may be the transcription of the video record 128. Alternatively or additionally, a written component may include supplementary information submitted by the user 108. Written component may include work history, work experience, credentials, work objectives, work expectations, and the like. Computing device is configured to transcribe video record 128. In some cases, processor 104 may include audiovisual speech recognition (AVSR) processes to recognize verbal content in video records. For example, processor 104 may use image content to aid in recognition of audible verbal content such as viewing subject move their lips to speak on video to process the audio content of video record 128. AVSR may use image component to aid the overall translation of the audio verbal content of video records. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstrum coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal content 136. For instance, audio vector and image vector may each be concatenated and used to predict speech made by a user 108, who is 'on camera.'

In some cases, processor 104 may be configured to recognize at least a keyword as a function of visual verbal content. In some cases, recognizing at least keyword may include optical character recognition. As used in this disclosure, a "keyword" is an element of word or syntax used to identify and/or match elements to each other. In some cases, processor 104 may transcribe much or even substantially all verbal content from resume video.

Video records transcription is illustrated in U.S. patent application Ser. No. 17/582,070, filed on Jan. 24, 2022, and entitled "SYSTEMS AND METHODS FOR PARSING AND COMPARING VIDEO RECORD DUPLICATIONS", the entirety of which is incorporated by reference in this disclosure.

Still referring to FIG. 1, processor 104 includes a display component 132. In one or more embodiments, display component 132 may be communicatively connected to processor 104. Display component 132 may be remote to processor 104 or integrated into processor 104. Communication between processor 104 and display component 132 may be wired or wireless. In one or more embodiments, display component 132 may be configured to display employment datum 120, audiovisual datum, database information, video record 128, and the like. Display component 132 may include a graphic user interface (GUI) that a user 108 may use to navigate through presented data or information by processor 104. GUI is configured to display the video record 128. In one or more embodiments, a GUI may include a plurality of lines, images, symbols, and the like to show information and/or data. In non-limiting embodiments, display component 132 may include a smartphone, tablet, laptop, desktop, monitor, tablet, touchscreen, head-up display (HUD), and the like. In one or more embodiments, display component 132 may include a screen such as a liquid crystal display (LCD) various other types of displays or monitors, as previously mentioned in this disclosure. In one or more embodiments, user 108 may view information and/or data displayed on display component 132 in real time. In one or more embodiments, display component 132 may be configured to display received or determined information, which may be toggled through using, for example, an input device of display component 132 or processor 104. Display component 132 may include electronic components utilized to display image data or information, such as a video, GUI, photo, and the like.

Figure 2:
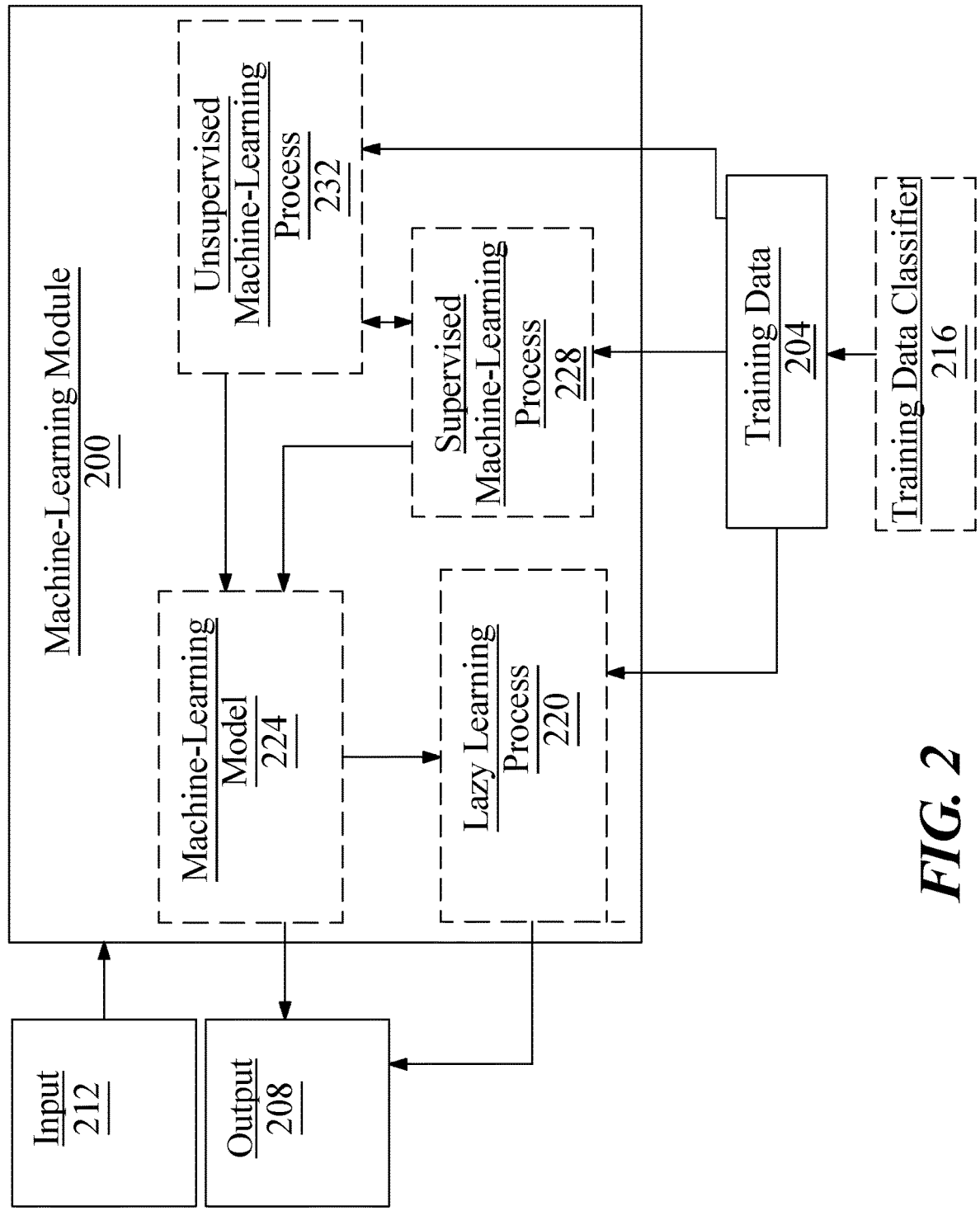
FIG. 2 is a block diagram of exemplary machine-learning processes.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a processor 104/module to produce outputs 208 given data provided as inputs 212; this is in contrast to a non-machine learning software program where the commands to be executed are determined in advance by a user 108 and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum 112 that labels or otherwise identifies a set of data that are clustered together, found to be close under a distance metric as described below, or the like. Machine learning module 200 may generate a classifier using a classification algorithm, defined as a processes whereby a processor 104 and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to according to fields of job description for instance, title, role, organization, requisite experience, requisite credentials, and the like.

Still referring to FIG. 2, machine learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include subject-specific data as described above as inputs, description-specific data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods.

Machine-learning algorithms may include neural net algorithms, including convolutional neural net processes.

Figure 3:
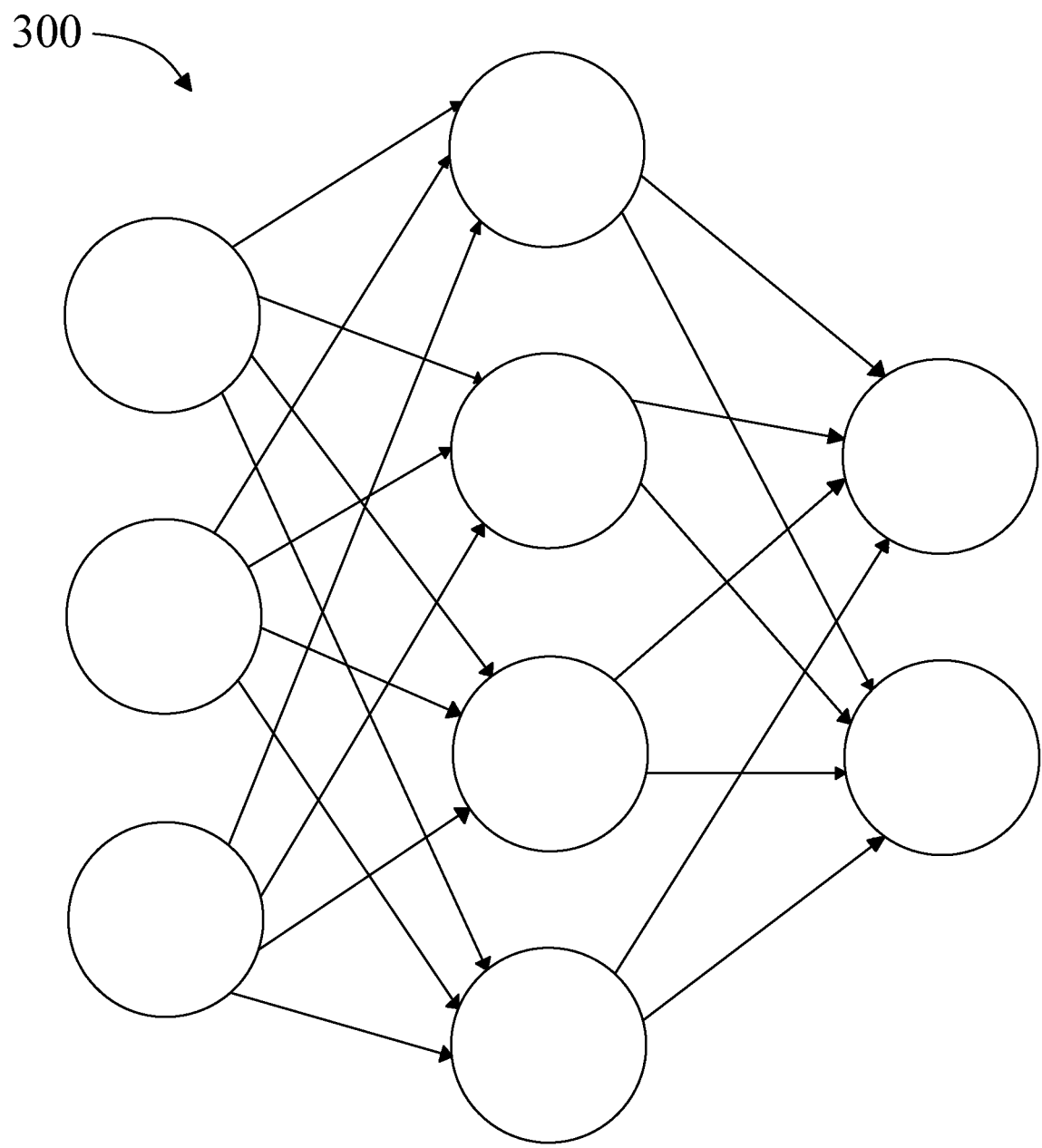
FIG. 3 illustrates an exemplary neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
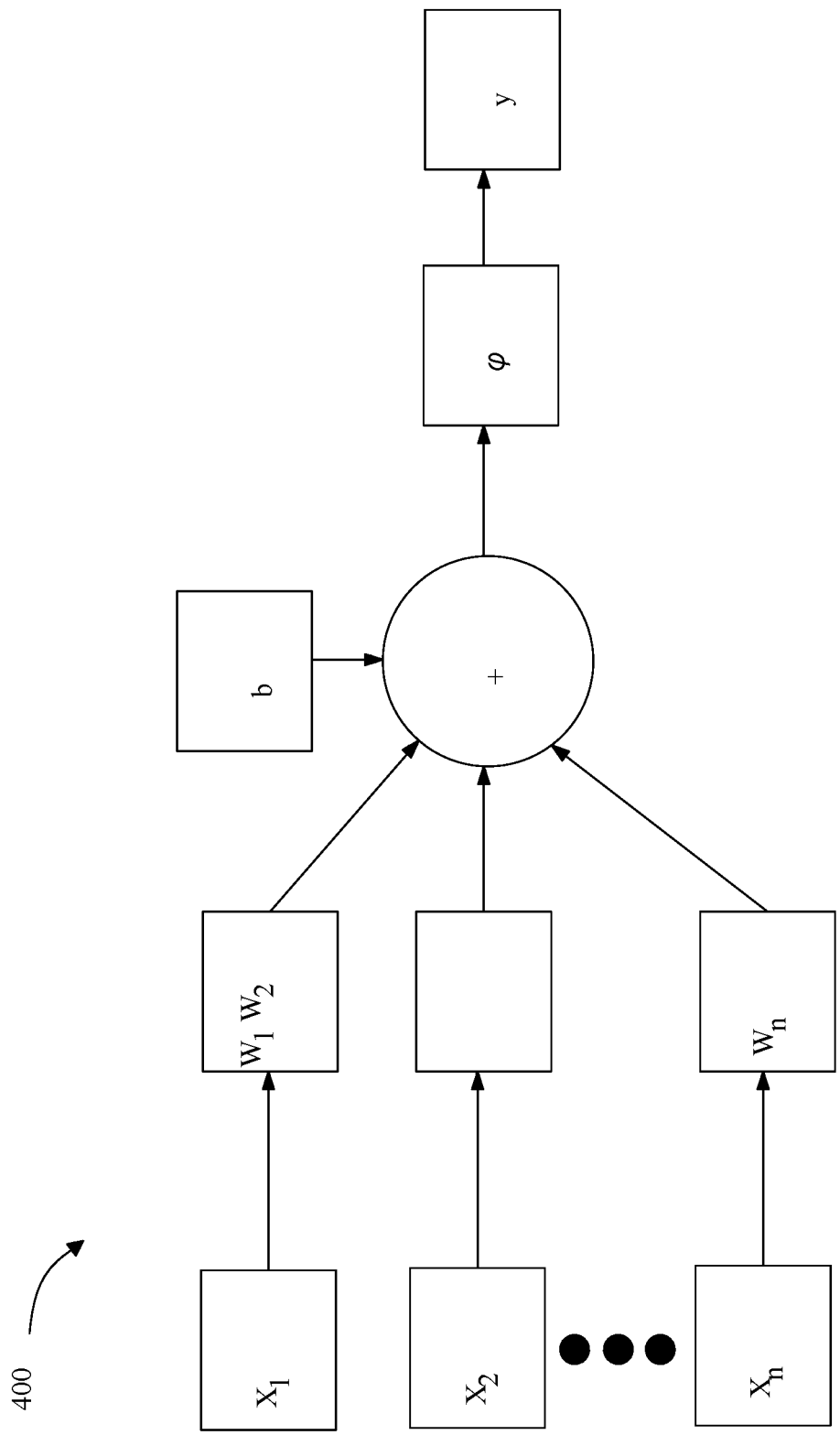
FIG. 4 is a block diagram of an exemplary node.

Referring now to FIG. 4, an exemplary embodiment of a node 400 of a neural network is illustrated. Node 400 may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
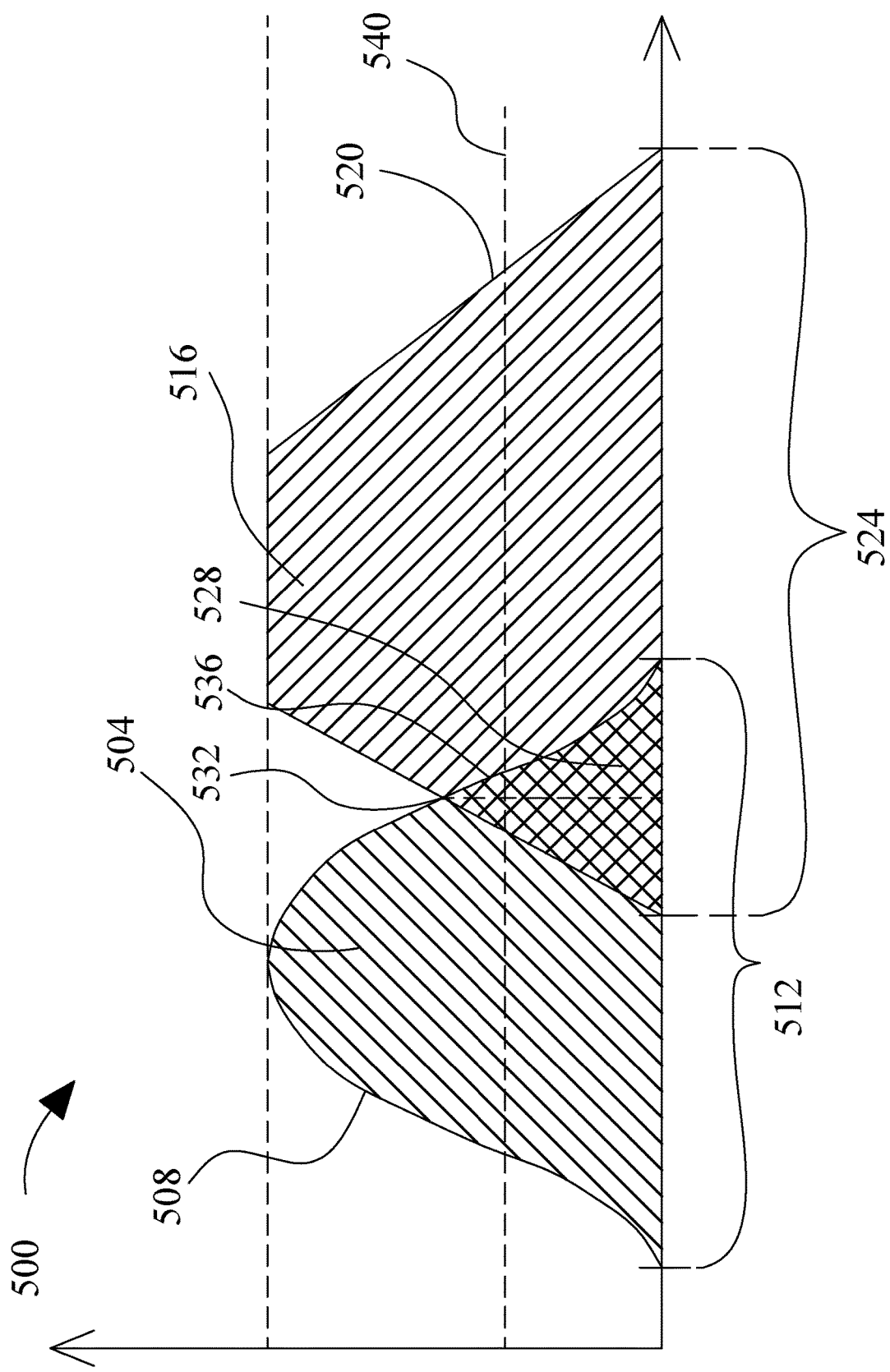
FIG. 5 is a graph illustrating an exemplary relationship between fuzzy sets.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more processes (e.g., machine-learning models), subject-specific data, and description-specific data. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or subject-specific data and a predetermined class, such as without limitation a job description, for combination to occur as described above. Alternatively or additionally, each threshold may be tuned by a machine-learning and/or statistical process, for instance and without limitation as described in further detail below.

Further referring to FIG. 5, in an embodiment, a degree of match between fuzzy sets may be used to classify a subject 120 with at least a job description 152a-n. For instance, if subject-specific data has a fuzzy set matching a job description fuzzy set by having a degree of overlap exceeding a threshold, processor 104 may classify the subject as being relevant or otherwise associated with the job description. Where multiple fuzzy matches are performed, degrees of match for each respective fuzzy set may be computed and aggregated through, for instance, addition, averaging, or the like, to determine an overall degree of match.

Still referring to FIG. 5, in an embodiment, subject-specific data may be compared to multiple class fuzzy sets representing job-descriptions. For instance, subject-specific data may be represented by an individual fuzzy set that is compared to each of the multiple class fuzzy sets; and a degree of overlap exceeding a threshold between the individual fuzzy set and any of the multiple class fuzzy sets may cause processor 104 to classify the subject as belonging to a job description. For instance, in one embodiment there may be two class fuzzy sets, representing a first job description and a second job description. First job description may have a first fuzzy set; second job description may have a second fuzzy set; and subject-specific data may have an individual fuzzy set. Processor 104, for example, may compare an individual fuzzy set with each of first fuzzy set and second fuzzy set, as described above, and classify a subject to either, both, or neither of first job description nor second job description. Machine-learning methods as described throughout may, in a non-limiting example, generate coefficients used in fuzzy set equations as described above, such as without limitation x, c, and σ of a Gaussian set as described above, as outputs of machine-learning methods. Likewise, subject-specific data may be used indirectly to determine a fuzzy set, as the fuzzy set may be derived from outputs of one or more machine-learning models that take the subject-specific data directly or indirectly as inputs. Although an exemplary application for fuzzy set matching is described above, fuzzy set matching may be used for any classifications or associations described within this disclosure.

Figure 6:
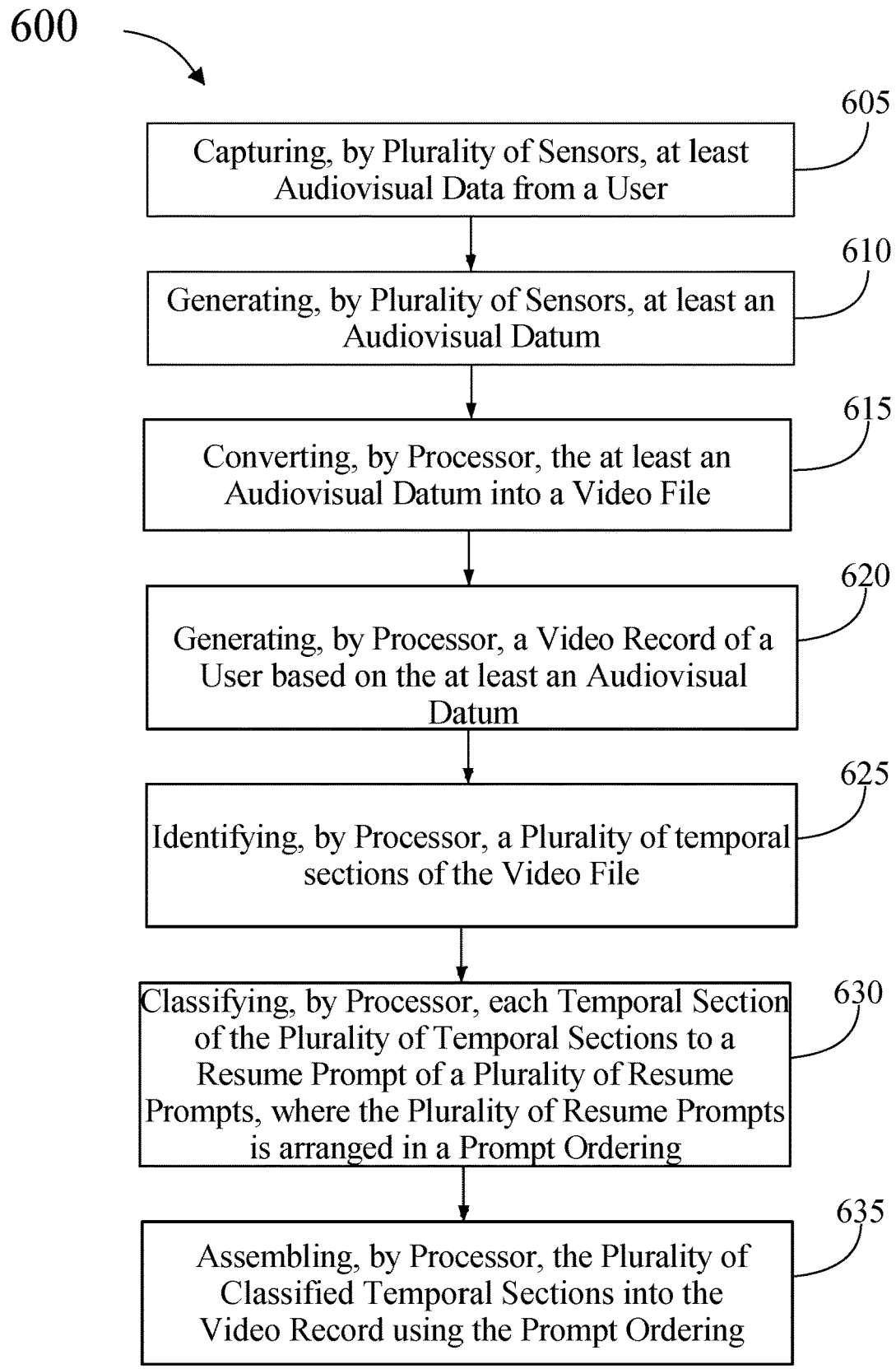
FIG. 6 is a flow diagram of an exemplary method for job forecasting.

Now referring to FIG. 6, an exemplary embodiment of method 600 for automated video record generation. At step 605, method 600 includes capturing, by plurality of sensors, at least audiovisual data from a user. Audiovisual data from a user may be based on an employment datum. An employment datum 120 may comprise of a user's work history. These steps may be implemented as described above, without limitation, in FIGS. 1-5.

At step 610, method 600 generating, by plurality of sensors, at least an audiovisual datum. In one or more embodiments, audiovisual data produced by a user 108 may be as a result of a prompt 116 presented by processor 104. These steps may be implemented as described above, without limitation, in FIGS. 1-5.

At step 615, method 600 includes converting, by processor, the at least an audiovisual datum into a video file. In one or more embodiments, video file may be compressed in one or more methods discussed above.

At step 620, method 600 includes generating, by processor, a video record of a user based on the at least an audiovisual datum. Video record may be generated with a machine learning algorithm discussed above. In an embodiment, video record 128 may include written and visual components. These steps may be implemented as described above, without limitation, in FIGS. 1-5.

At step 625, method 600 includes identifying, by processor, a plurality of temporal sections of the video file. At step 630, method 600 includes classifying, by processor, each temporal section of the plurality of temporal sections to a resume prompt of a plurality of resume prompts, where the plurality of resume prompts is arranged in a prompt ordering. At step 635, method 600 includes assembling, by processor, the plurality of classified temporal sections into the video record using the prompt ordering.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
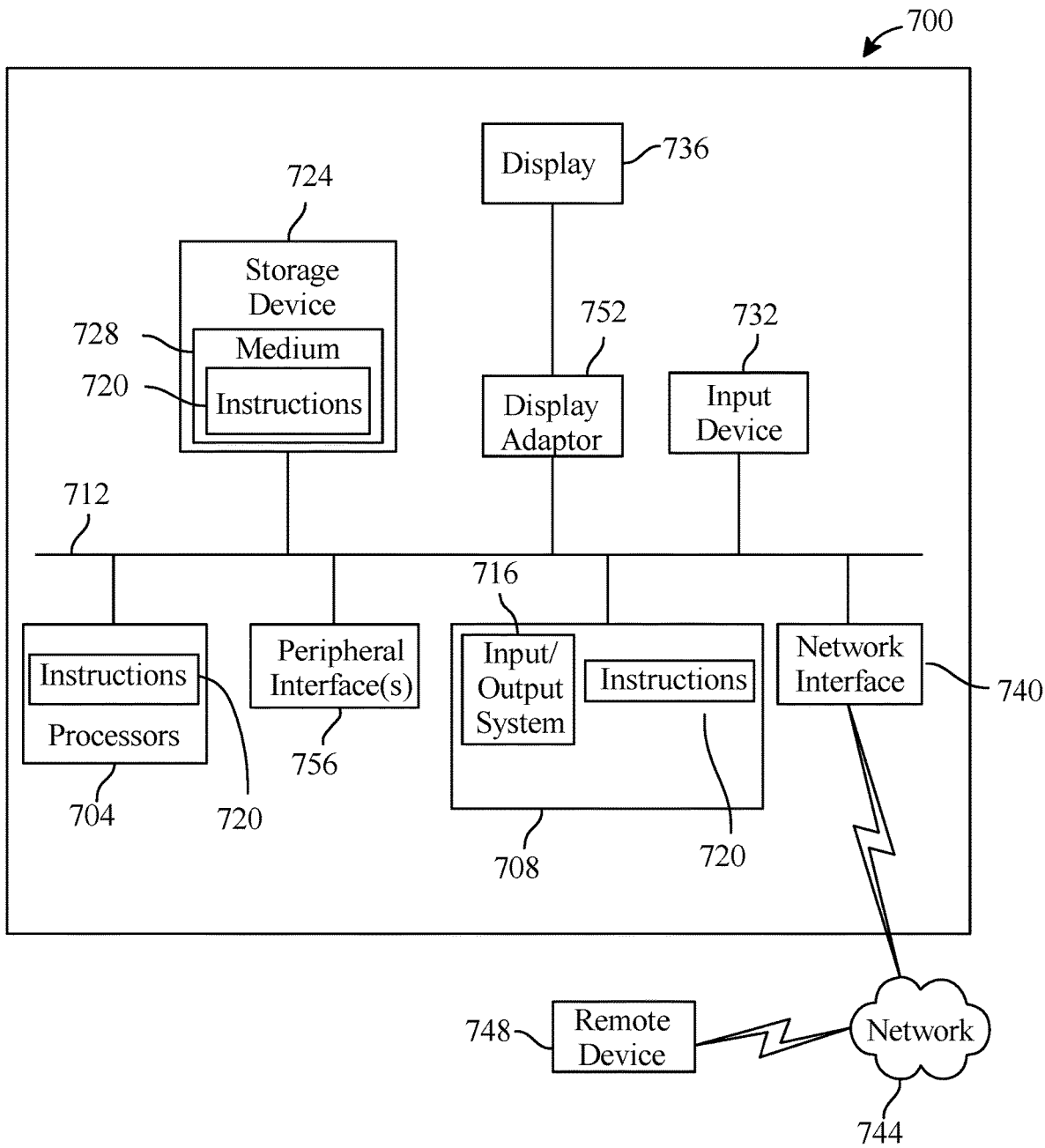
FIG. 7 is a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device 736, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for automated video record generation, the apparatus comprising:
    a plurality of sensors configured to:
        capture at least audiovisual data from a user;
        generate at least an audiovisual datum based on the at least audiovisual data from the user;
    at least a processor communicatively connected to the plurality of sensors; and
    a memory communicatively connected to the processor, the memory containing instructions configuring the at least a processor to:
        receive at least an employment datum from the user, wherein the employment datum comprises information on a job position the user is interested in being a candidate for;
        generate a plurality of record prompts based on the at least an employment datum, wherein generating the plurality of record prompts comprises:
            receiving training data, wherein the training data correlates the at least an employment datum and the job position the user is interested in being a candidate for utilizing a neural network classifier, wherein the neural network classifier is configured to classify the at least an employment datum to a template, and wherein the template comprises a list of record prompts in a specific order;
            training a machine learning process as a function of the training data;
            outputting the plurality of record prompts as a function of the machine learning process and the at least an employment datum;
        convert the at least an audiovisual datum into a video file; and
        generate a video record of the user based on the at least an audiovisual datum, wherein generating the video record further comprises:
            identifying a plurality of temporal sections of the video file;
            classifying each temporal section of the plurality of temporal sections to a record prompt of the plurality of record prompts, wherein the plurality of record prompts is arranged in a prompt ordering; and
            assembling the plurality of classified temporal sections into the video record using the prompt ordering.

2. The apparatus of claim 1, wherein the plurality of sensors comprises an auditory sensor.

3. The apparatus of claim 1, wherein the plurality of sensors comprises an optical sensor.

4. The apparatus of claim 1, wherein the at least a processor is further configured to transcribe the video record.

5. The apparatus of claim 1, wherein the at least a processor is further configured to train a neural network to identify the plurality of temporal sections of the video file.

6. The apparatus of claim 1, wherein the machine-learning module is further configured to use a classifier to classify job posting data to generate record prompts.

7. The apparatus of claim 1, wherein the at least a processor is communicatively connected to a display component.

8. The apparatus of claim 7, wherein the display component is configured to display the video record.

9. The apparatus of claim 1, wherein the video record comprises a written component.

10. A method for automated video record generation, the method comprising:
    capturing, by a plurality of sensors, at least audiovisual data from a user;
    generating, by the plurality of sensors, at least an audiovisual datum based on the at least audiovisual data from the user;
    receiving, by at least a processor, at least an employment datum from the user, wherein the employment datum comprises information on a job position the user is interested in being a candidate for;
    generating, by the at least a processor, a plurality of record prompts based on the at least an employment datum wherein generating the plurality of record prompts further comprises:
        receiving training data, wherein the training data correlates the at least an employment datum and the job position the user is interested in being a candidate for utilizing a neural network classifier, wherein the neural network classifier is configured to classify the at least an employment datum to a template, and wherein the template comprises a list of record prompts in a specific order;
        training a machine learning process as a function of the training data;
        outputting the plurality of record prompts as a function of the machine learning process and the at least an employment datum;
    converting, by at least a processor, the at least an audiovisual datum into a video file; and
    generating, by the at least a processor, a video record of the user based on the at least an audiovisual datum, wherein generating the video record further comprises:
        identifying a plurality of temporal sections of the video file;
        classifying-each temporal section of the plurality of temporal sections to a record prompt of the plurality of record prompts, wherein the plurality of record prompts is arranged in a prompt ordering; and
        assembling the plurality of classified temporal sections into the video record using the prompt ordering.

11. The method of claim 10, wherein the plurality of sensors comprises an auditory sensor.

12. The method of claim 10, wherein the plurality of sensors comprises an optical sensor.

13. The method of claim 10, wherein the at least a processor is further configured to transcribe the video record.

14. The method of claim 10, wherein the at least a processor is further configured to train a neural network to identify the plurality of temporal sections of the video file.

15. The method of claim 10, wherein the machine-learning module is further configured to use a classifier to classify job posting data to generate record prompts.

16. The method of claim 10, wherein the at least a processor is communicatively connected to a display component.

17. The method of claim 16, wherein the display component is configured to display the video record.

18. The method of claim 10, wherein the video record comprises a written component.

* * * * *